US011028761B1

(12) United States Patent
Kraus et al.

(10) Patent No.: US 11,028,761 B1
(45) Date of Patent: Jun. 8, 2021

(54) SERVICEABLE COOLING WATER STRAINERS FOR STRAINING COOLING WATER IN MARINE PROPULSION DEVICES (71) Applicant: Brunswick Corporation, Mettawa, IL (US)

(72) Inventors: Jeremy J. Kraus, Mt. Calvary, WI (US); Katelyn A. Vara, Van Dyne, WI (US)

(73) Assignee: Brunswick Corporation, Mettawa, IL (US)

( * ) Notice: Subject to any disclaimer, the term of this patent is extended or adjusted under 35 U.S.C. 154(b) by 212 days.

(21) Appl. No.: 16/001,326

(22) Filed: Jun. 6, 2018

(51) Int. Cl.
*F01N 13/10* (2010.01)
*F01N 13/00* (2010.01)
*F01N 3/02* (2006.01)
*F01N 3/04* (2006.01)
*B01D 35/02* (2006.01)
*B01D 35/28* (2006.01)
*B63H 21/38* (2006.01)
*B01D 35/16* (2006.01)
*B05B 15/40* (2018.01)

(52) U.S. Cl.
CPC ............. *F01N 13/10* (2013.01); *B01D 35/02* (2013.01); *B01D 35/16* (2013.01); *B01D 35/28* (2013.01); *B63H 21/383* (2013.01); *F01N 3/0205* (2013.01); *F01N 3/04* (2013.01); *F01N 13/004* (2013.01); *B01D 2201/342* (2013.01); *B05B 15/40* (2018.02); *F01N 2260/024* (2013.01)

(58) Field of Classification Search
CPC .... B63H 20/001; B63H 20/28; B63H 20/285; F01N 13/141; F01N 2240/02; F01N 2260/024; F01N 2260/20; F01N 2470/24; F01N 2590/02; F01N 2610/00; F01N 2610/14; F01N 2610/1453; F01N 3/0293; F01N 3/033; F01N 3/04; F01N 3/046; F01P 2050/02; F01P 3/202
See application file for complete search history.

(56) References Cited

U.S. PATENT DOCUMENTS

| 5,803,036 | A | 9/1998 | Takahashi |
| 5,820,426 | A | 10/1998 | Hale |
| 5,873,330 | A | 2/1999 | Takahashi |
| 6,120,335 | A | 9/2000 | Nakase et al. |
| 6,226,984 | B1 | 5/2001 | Ford |
| 6,461,208 | B2 | 10/2002 | Suzuki et al. |

(Continued)

*Primary Examiner* — Phutthiwat Wongwian
*Assistant Examiner* — Diem T Tran
(74) *Attorney, Agent, or Firm* — Andrus Intellectual Property Law, LLP (57) ABSTRACT

A marine propulsion device has an engine; an exhaust manifold for conveying exhaust gas from the engine; a cooling water jacket on the exhaust manifold, wherein a cooling water passage for conveying cooling water alongside the exhaust manifold is defined between the cooling water jacket and exhaust manifold; and a cooling water sprayer that sprays cooling water into the exhaust manifold. A manually serviceable cooling water strainer configured to strain cooling water supplied from the cooling water passage to the cooling water sprayer. The manually serviceable cooling water strainer can be manually coupled to and manually uncoupled from the marine propulsion device without use of a tool.

18 Claims, 8 Drawing Sheets

(56) References Cited

U.S. PATENT DOCUMENTS

| | | | |
|---|---|---|---|
| 6,783,412 B1 * | 8/2004 | Wynveen | F01P 11/14 |
| | | | 440/88 M |
| 7,001,231 B1 | 2/2006 | Halley et al. | |
| 7,625,257 B1 | 12/2009 | Broman et al. | |
| 7,942,138 B1 | 5/2011 | Belter | |
| 8,500,501 B1 | 8/2013 | Taylor et al. | |
| 8,540,536 B1 | 9/2013 | Eichinger et al. | |
| 8,763,566 B1 | 7/2014 | Taylor et al. | |
| 9,365,274 B1 | 6/2016 | George et al. | |
| 9,365,275 B1 | 6/2016 | Habeck et al. | |
| 9,403,588 B1 * | 8/2016 | George | B63H 20/285 |
| 9,534,526 B1 | 1/2017 | Eichinger et al. | |
| 9,616,987 B1 | 4/2017 | Langenfeld et al. | |
| 10,293,910 B1 * | 5/2019 | Torgerud | F01P 3/202 |

* cited by examiner

SERVICEABLE COOLING WATER STRAINERS FOR STRAINING COOLING WATER IN MARINE PROPULSION DEVICES

FIELD

The present disclosure relates to marine propulsion devices, and particularly to cooling systems for marine propulsion devices having cooling water strainers.

BACKGROUND

The following U.S. Patents are incorporated herein by reference in entirety.

U.S. Pat. No. 9,616,987 discloses a marine engine having a cylinder block with first and second banks of cylinders disposed along a longitudinal axis and extending transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,365,275 discloses an outboard marine propulsion device having an internal combustion engine with a cylinder head and a cylinder block, and an exhaust manifold that discharges exhaust gases from the engine towards a catalyst housing. The exhaust manifold has a plurality of horizontally extending inlet runners that receive the exhaust gases from the engine and a vertically-extending collecting passage that conveys the exhaust gases from the plurality of horizontally-extending inlet runners to a bend that redirects the exhaust gases downwardly towards the catalyst housing.

U.S. Pat. No. 8,540,536 discloses a cooling system for a marine engine having an exhaust manifold with a first end receiving hot exhaust gas from the marine engine and a second end discharging the exhaust gas, and an elongated cooling water jacket extending adjacent to the exhaust manifold. The cooling water jacket receives raw cooling water at a location proximate to the second end of the exhaust manifold, conveys raw cooling water adjacent to the exhaust manifold to thereby cool the exhaust manifold and warm the raw cooling water, and thereafter discharges the warmed cooling water to cool the internal combustion engine.

U.S. Pat. No. 8,500,501 discloses an outboard marine drive including a cooling system drawing cooling water from a body of water in which the outboard marine drive is operating and supplying the cooling water through cooling passages in an exhaust tube in the driveshaft housing, a catalyst housing, and an exhaust manifold, and thereafter through cooling passages in the cylinder head and the cylinder block of the engine. A three-pass exhaust manifold is provided. A method is provided for preventing condensate formation in a cylinder head, catalyst housing, and exhaust manifold of an internal combustion engine of a powerhead in an outboard marine drive.

U.S. Pat. No. 7,001,231 discloses a water cooling system for an outboard motor having a water conduit that extends through both an idle exhaust relief passage and a primary exhaust passage. Water within the water conduit flows through first and second openings to distribute sprays or streams of water into first and second exhaust manifolds, which can be the primary and idle exhaust relief passages of an outboard motor.

SUMMARY

This Summary is provided to introduce a selection of concepts that are further disclosed herein below in the Detailed Description. This Summary is not intended to identify key or essential features of the claimed subject matter, nor is it intended to be used as an aid in limiting scope of the claimed subject matter.

In certain non-limiting examples, a marine propulsion device has an engine, an exhaust manifold for conveying exhaust gas from the engine, a cooling water jacket on the exhaust manifold, wherein a cooling water passage for conveying cooling water alongside the exhaust manifold is defined between the cooling water jacket and exhaust manifold, and a cooling water sprayer that sprays cooling water into the exhaust manifold. A manually serviceable cooling water strainer is configured to strain cooling water supplied from the cooling water passage to the cooling water sprayer. The manually serviceable cooling water strainer has a plug with a plurality of holes that separates solids from the cooling water. The plug further has an internal bore that receives cooling water from the cooling water passage via the plurality of holes and a plug outlet through which the cooling water flows from the internal bore. The plug outlet is located axially between the first and second ends. The second end is configured for manual grasping by a service technician for removal and replacement of the plug with respect to the exhaust manifold. A boss on the exhaust manifold has a bore into which the plug extends when the cooling water strainer is coupled to the exhaust manifold. First and second seals are located on opposite sides of the plug outlet, respectively, and form a water-tight seal with respect to the plug and the boss when the plug is manually coupled to the boss. The boss further has a radially extending boss outlet through which cooling water from the plug outlet is conveyed.

DETAILED DESCRIPTION OF THE DRAWINGS

Figure 1:
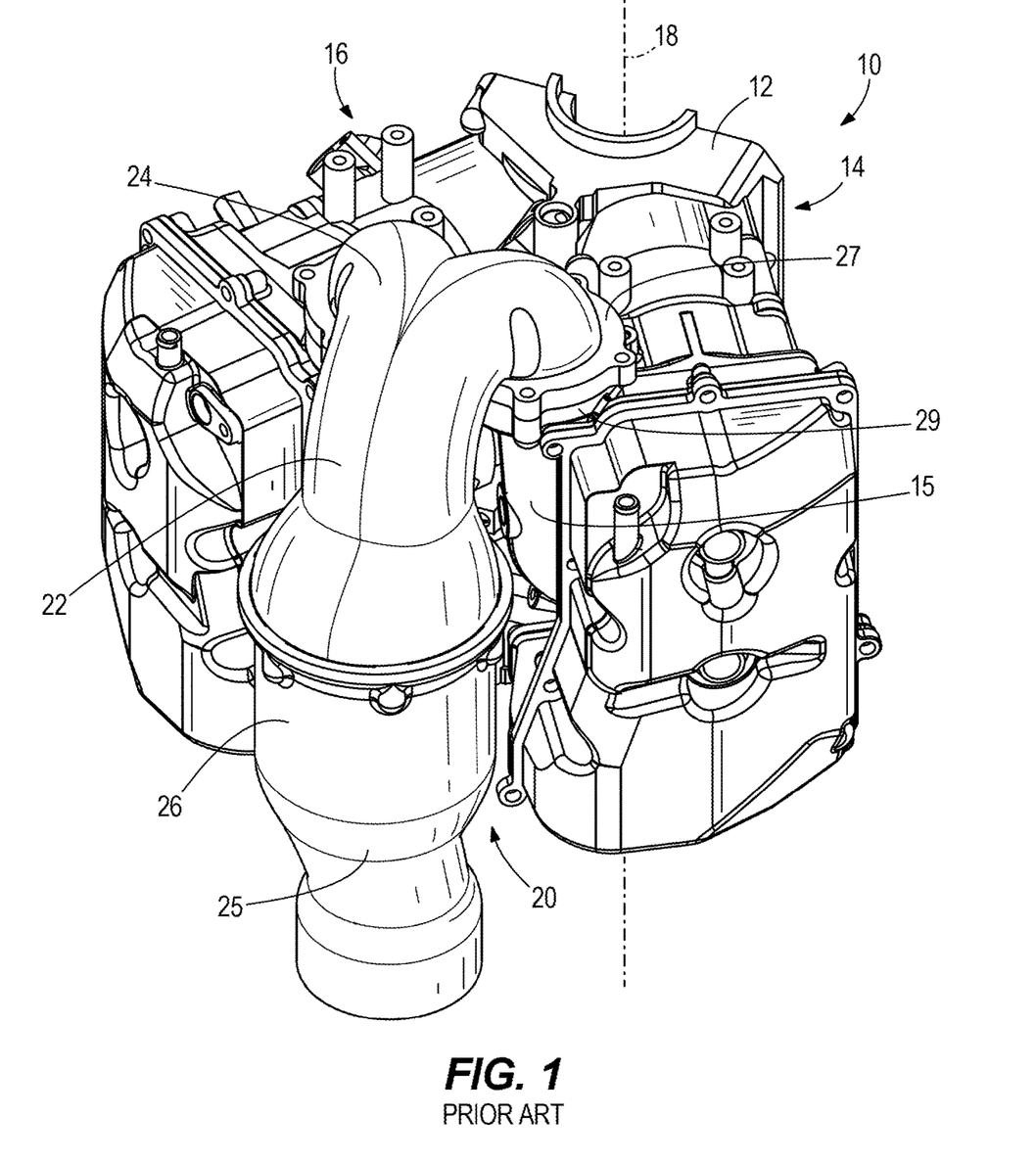
FIG. 1 is taken from U.S. Pat. No. 9,616,987 and is a perspective view of an internal combustion engine for marine propulsion device.

FIG. 1 is taken from U.S. Pat. No. 9,616,987 and depicts an internal combustion engine 10 configured for use in an outboard motor. The internal combustion engine 10 has a cylinder block 12 with first and second banks of cylinders 14, 16 that are disposed along a vertical axis 18 and extend transversely with respect to each other in a V-shape so as to define a valley 20 therebetween. The number and configuration of cylinders can vary from what is shown. An exhaust manifold 22 is configured to convey exhaust gas from the internal combustion engine 10. The configuration of the exhaust manifold 22 can also vary from what is shown. In the illustrated example, the exhaust manifold 22 is disposed in the valley 20 and initially conveys the exhaust gas vertically upwardly from cast-in exhaust conduits 15 on the respective banks of cylinders 14, 16, through a 180-degree bend 24, and then vertically downwardly through an elongated conduit 25, which includes an optional catalyst receptacle 26 having a catalyst therein for treating the exhaust gas, all as disclosed in the '987 patent.

Figure 2:
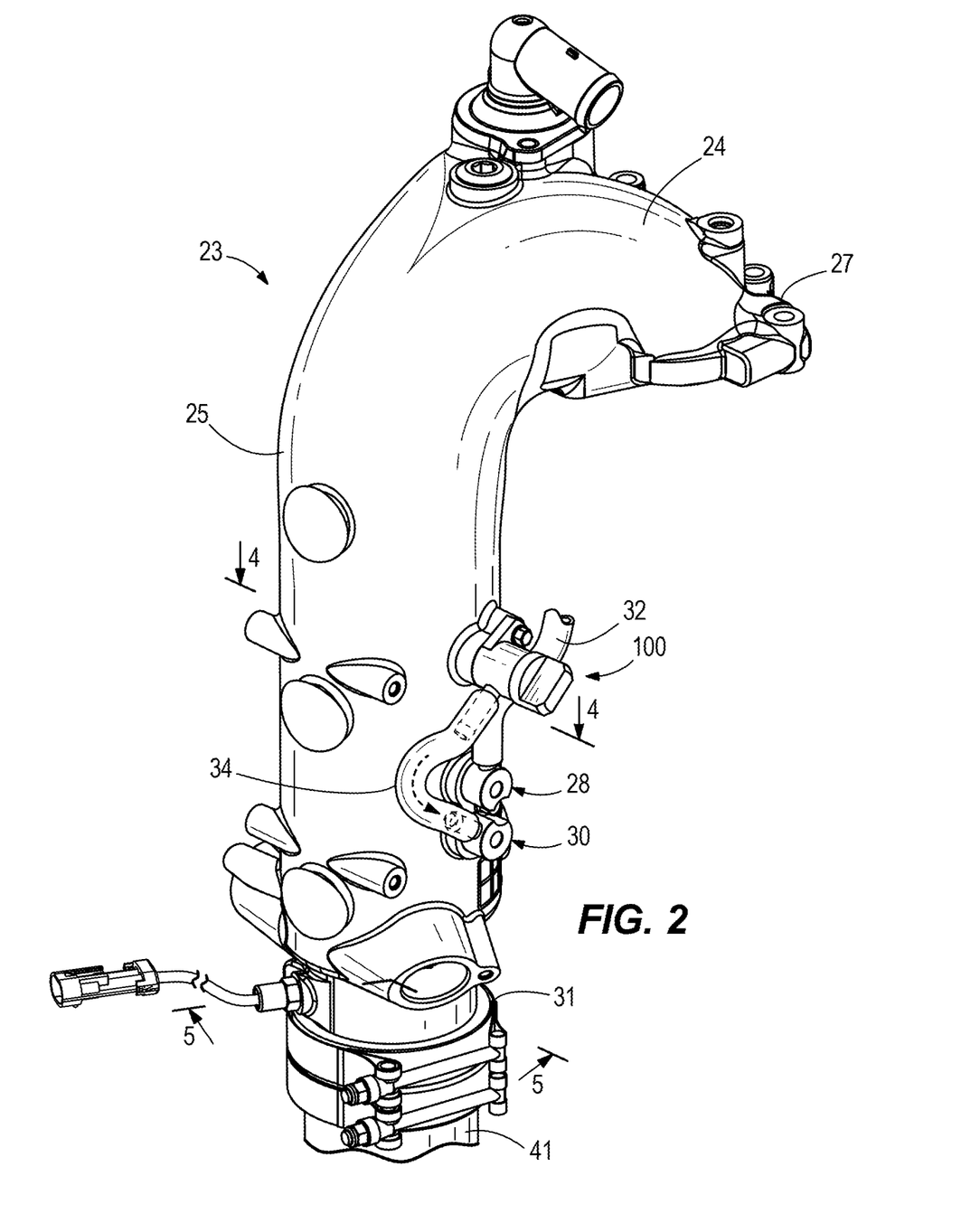
FIG. 2 is a perspective view of an exhaust manifold according to the present disclosure.
Figure 3:
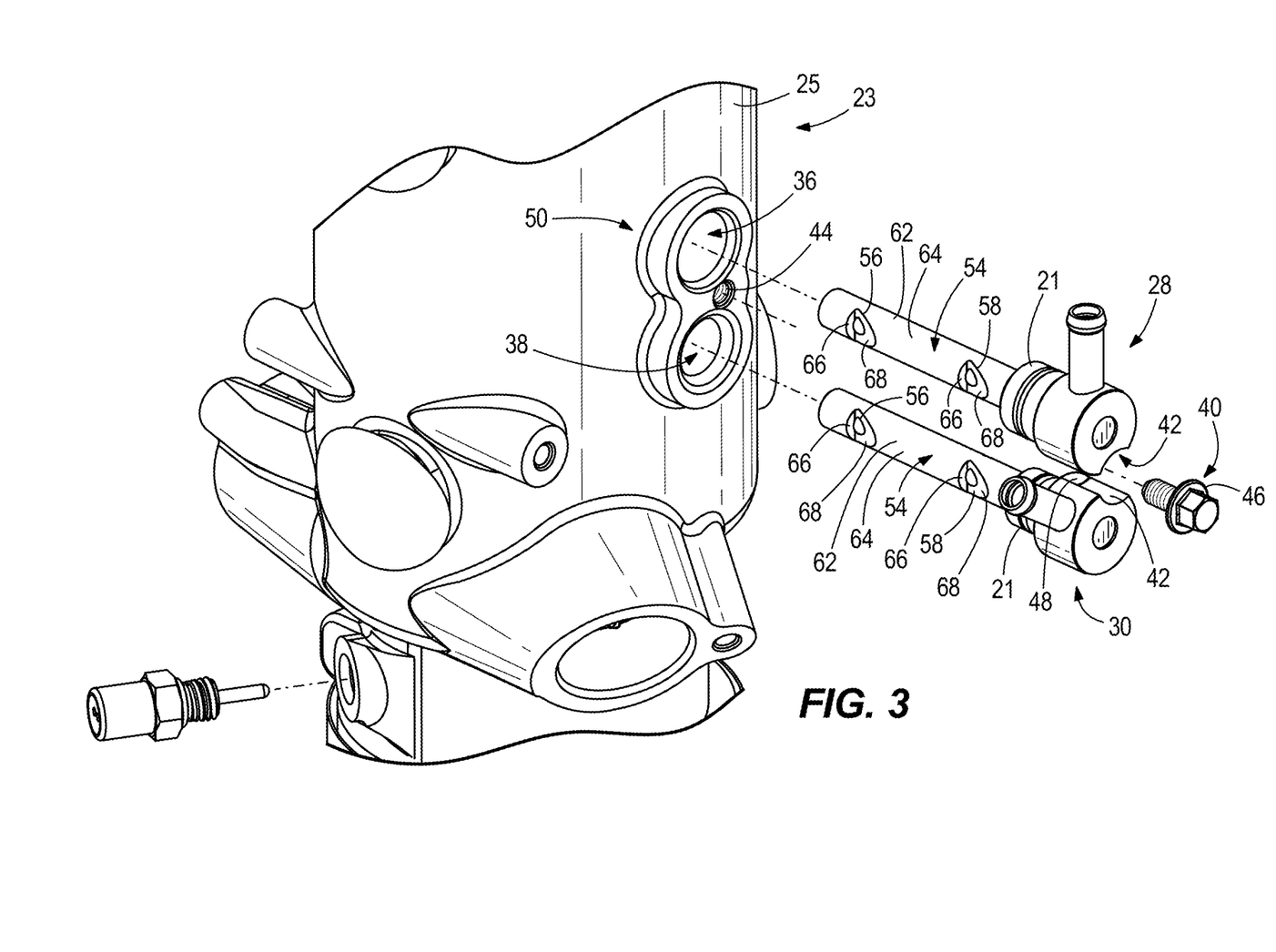
FIG. 3 an exploded view of a lower portion of the exhaust manifold and cooling water sprayers for spraying cooling water into the exhaust manifold.
Figure 4:
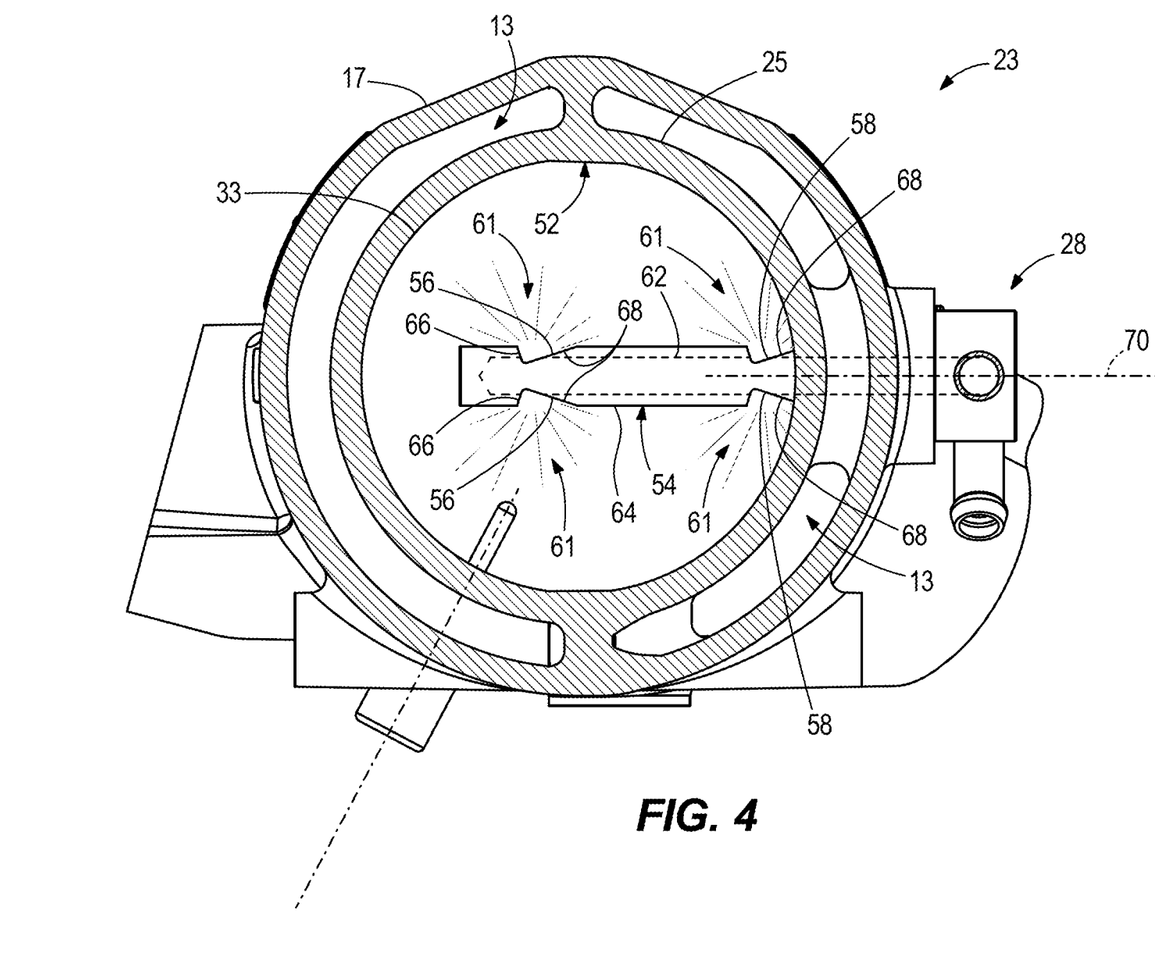
FIG. 4 is a view of Section 4-4, taken in FIG. 2.
Figure 5:
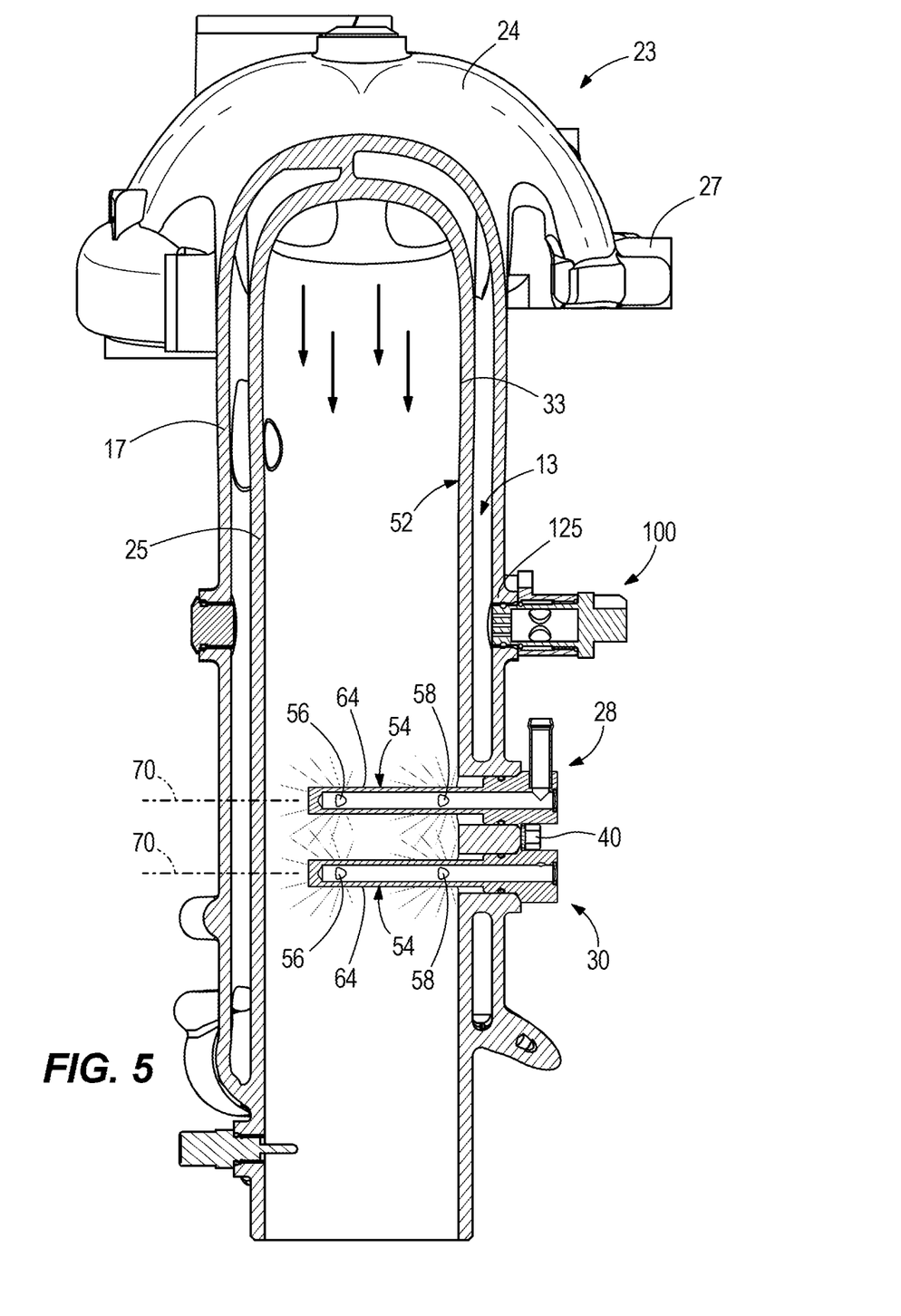
FIG. 5 is a view of Section 5-5, taken in FIG. 2.
Figure 6:
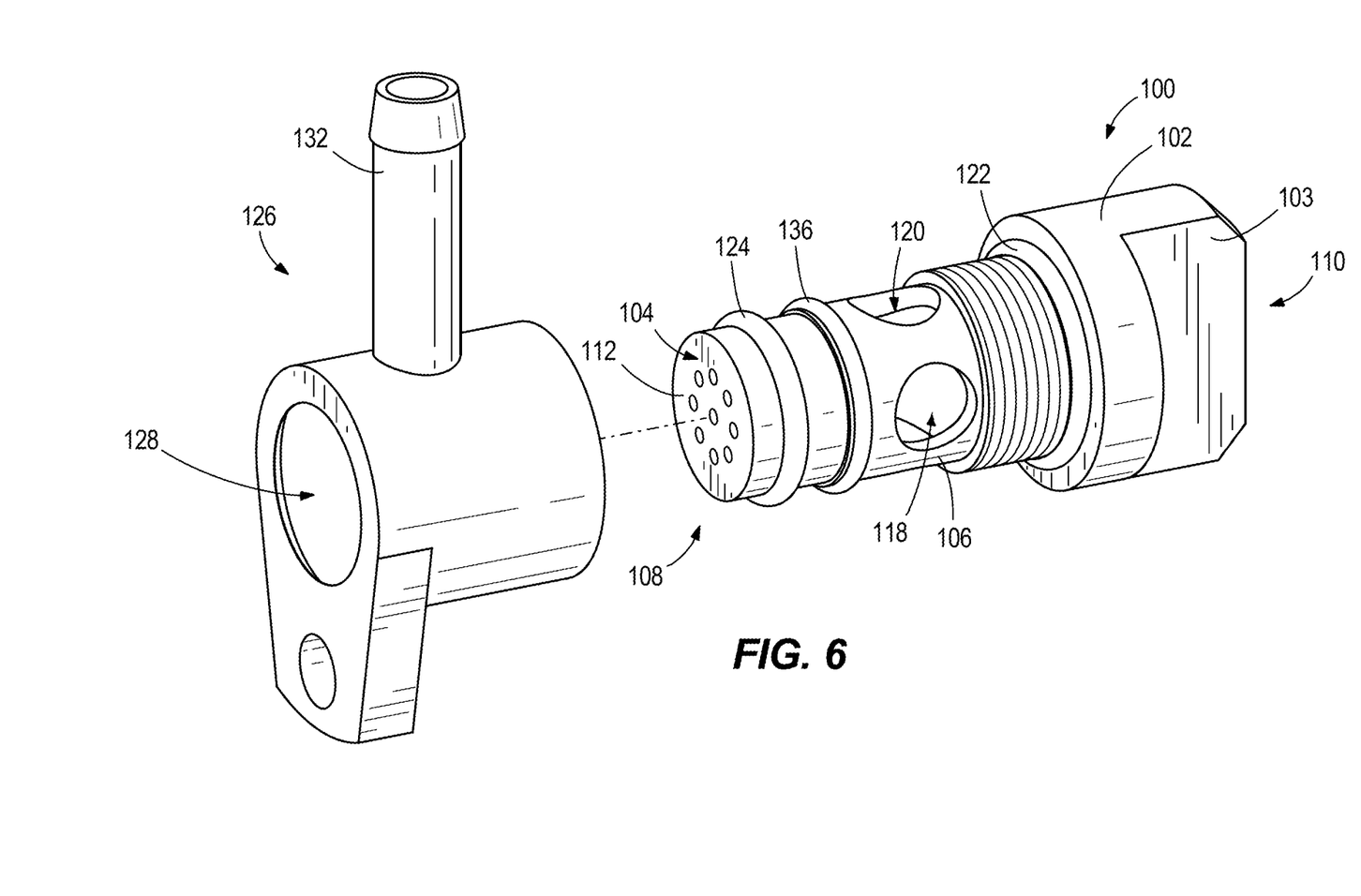
FIG. 6 is an exploded view of a cooling water strainer according to the present disclosure.

FIGS. 2-5 depict an exhaust manifold 23 for use an internal combustion engine for an outboard motor configuration, such as the exemplary internal combustion engine 10 shown in FIG. 1. Like reference numbers are used for features that are similar to the exhaust manifold 22. Similar to the example in FIG. 1, the exhaust manifold 23 has a 180-degree bend 24 and elongated conduit 25. Flanges 27 on the 180-degree bend 24 mate with upwardly-facing flanges 29 (see FIG. 1) on the cast-in conduits 15 on the first and second banks of cylinders 14, 16. As disclosed in the '987 patent, exhaust gases from the respective cast-in conduits 15 are merged in the 180-degree bend 24 and then conveyed downwardly through the elongated conduit 25. A flange 31 is mated with a downstream exhaust tube 41 to further convey the exhaust gas away from the internal combustion engine 10. As shown in FIGS. 4 and 5, a cooling jacket 17 is disposed on the exhaust manifold 23 and defines a cooling water passage 13 configured to convey cooling water upwardly and/or downwardly alongside the exhaust manifold 23, in a heat exchange relationship with a sidewall 33 of the exhaust manifold 23 and the relatively hot exhaust gas flowing there through. Unlike the example shown in FIG. 1, the exhaust manifold 23 does not have the optional catalyst receptacle 26 and catalyst therein.

It is desirable to cool relatively hot exhaust gases emitted from the internal combustion engine. It is also desirable to do so in a reliable, uniform and complete manner by for example pumping cooling water through the cooling water passage 13 and/or by injecting the cooling water into the flow of exhaust gas at various water pressures and flow rates.

Referring now to FIGS. 2-5, a cooling system is provided for cooling the exhaust manifold 23 and the exhaust gas flowing through the exhaust manifold 23. In the illustrated example, the cooling system includes first and second cooling water sprayers 28, 30 that are configured to spray first and second flows of cooling water into the exhaust gas, respectively. The cooling water sprayers 28, 30 are vertically aligned (e.g., stacked) with respect to each other and with respect to the exhaust manifold 23. A first conduit 32 is connected to the first cooling water sprayer 28 and a separate, second conduit 34 is connected to the second cooling water sprayer 30. The first and second conduits 32, 34 convey the separate, first and second flows of cooling water, respectively, to the cooling water sprayers 28, 30. The first and second conduits 32, 34 are separate from each other such that the first and second flows of cooling water remain separate as they are conveyed to the respective cooling water sprayers 28, 30, in parallel. In the illustrated example, the second conduit 34 receives the second flow of cooling water from the cooling water passage 13 via a cooling water strainer 100, as will be further described herein below. The first and second flows of cooling water can both derive from a conventional upstream cooling water pump that pumps raw water from the body of water in which the outboard motor is operating. The raw water can be obtained from, for example, one or more conventional cooling water inlets on the gearcase of the outboard motor.

Referring to FIG. 3, the first cooling water sprayer 28 is fitted in a first radial through-bore 36 in the exhaust manifold 23. The second cooling water sprayer 30 is fitted in a second radial through-bore 38 in the exhaust manifold 23. The first and second radial through-bores 36, 38 each extend through the sidewall 33 of the exhaust manifold 23, and through the cooling jacket 17 on the sidewall 33. Optionally, the first and second radial through-bores 36, 38 can have different sizes (e.g. diameters) with respect to each other, which correspond to differently-sized base portions 21 of the cooling water sprayers 28, 30, to prevent an incorrect assembly of the cooling water sprayers 28, 30 with the exhaust manifold 23. A retainer 40 retains both of the cooling water sprayers 28, 30 with respect to the exhaust manifold 23. In the illustrated example, both of the cooling water sprayers 28, 30 have an outer circumference with a radial notch 42 in which the retainer 40, in this example a bolt, is registered, to thereby retain the cooling water sprayers 28, 30 in place. The retainer 40 has a threaded shank that is received in a threaded hole 44 located in between the first and second radial through-bores 36, 38. The retainer 40 further has an outer flange 46 that registers with radial engagement surfaces 48 located within the respective radial notches 42. Threading the retainer 40 into the threaded hole 44 sandwiches the radial engagement surfaces 48 between the outer flange 46 and a boss 50 on the exhaust manifold 23, through which the first and second radial through-bores 36, 38 are formed, thereby retaining the cooling water sprayers 28, 30 in place.

Referring to FIGS. 4 and 5, the cooling water sprayers 28, 30 are specially configured to spray the respective first and second flows of cooling water radially outwardly toward the inner diameter 52 of the sidewall 33 of the exhaust manifold 23. In certain examples, each cooling water sprayer 28, 30 is configured to spray the flow of cooling water so that a swirling flow of cooling water results, i.e. circumferentially around and spirally downwardly along the inner diameter 52. Each of the cooling water sprayers 28, 30 has an elongated sprayer body 54 that radially extends into the exhaust manifold 23 and conveys the respective flow of cooling water radially inwardly through the cooling jacket 17, through the cooling water passage 13, and through the sidewall 33 of the exhaust manifold 23 and toward the interior of the conduit 25. As noted in FIGS. 3 and 4, each of the cooling water sprayers 28, 30 also has first and second pairs of diametrically-opposing nozzles 56, 58 that are each configured to spray the flow of cooling water radially outwardly in a fan-shaped pattern 61 (see FIG. 4) toward the inner diameter 52 of the radially exhaust manifold 23. The sprayer body 54 includes a cylinder 62 that radially extends into the conduit 25. As shown in FIG. 4, the flows of cooling water are sprayed radially outwardly from the nozzles 56, 58, radially outwardly from the cylinder 62. The first and second pairs of nozzles 56, 58 are spaced apart from each other along the sprayer body 54. Each of the nozzles 56, 58 have the same or roughly the same shape, size and orientation.

Referring to FIGS. 4 and 5, the nozzles 56, 58 are defined by a tangential cutout in the outer surface of the cylinder 62. Each tangential cutout has radially extending endwall 66 upon which the flow of cooling water impinges as it flows through the cylinder 62. Each cutout also has tangentially tapered group of sidewalls 68 that extend tangentially outwardly and extend from the outer surface 64 of the cylinder 62 to the endwall 66. Each tangentially tapered group of sidewalls 68 defines a three-sided radial aperture in the cylinder 62. Stated another way, the sprayer body 54 is elongated along a sprayer body axis 70 and the endwall 66 extends approximately perpendicularly radially outwardly with respect to the sprayer body axis 70. The tangentially tapered group of sidewalls 68 extends at an approximately tangential angle to the sprayer body axis 70 and at a substantially perpendicular angle to the endwall 66. Other configurations can be employed to achieve the fan-shaped pattern 61.

Thus, according to examples disclosed herein, the cooling water system for the outboard motor has redundant sprayers and filters, which provide an added layer of protection against a loss of function. Each cooling water sprayer 28, 30 is fed by an independent water source which protects the system from external and internal contamination clogging the cooling water sprayers 28, 30. The cooling water sprayers 28, 30 are stacked on top of each other and spray into the exhaust gas. To ensure the cooling water sprayers 28, 30 are installed correctly, the sprayer bodies 54 are configured so that one retainer 40 can be used to hold both cooling water sprayers 28, 30 in their intended position. The sprayer bodies 54 have base portions 21 having different diameters to "poke-a-yoke" their installation with the correct through-bores 36, 38. The radial notch 42 in each sprayer body 54 allows the retainer 40 to hold the sprayer bodies 54 in position and maintain their rotation.

During research and experimentation, the present inventors have also determined that a blockage or other failure of one or both of the cooling water sprayers 28, 30 can cause an excessively high exhaust gas temperature, which can damage the internal combustion engine and/or components thereof. A failure of the cooling water sprayers 28, 30 can result from impassible debris from the inlet port of the cooling system and/or impassible debris that is built up and liberated from inside the cooling system. As such, the present inventors have determined that it is desirable to provide one or more strainers in the cooling water system for straining solid materials from the cooling water, upstream of the sprayers. The present inventors have further determined that it is desirable to provide a strainer that is easily serviced in the field, without the use of tools. This is advantageous because the strainer can sometimes become clogged with solid materials.

Referring now to FIGS. 2 and 5-7, a manually serviceable cooling water strainer 100 is configured to strain the cooling water supplied from the cooling water passage 13 to the cooling water sprayer 30. As described herein below, the manually serviceable cooling water strainer 100 advantageously can be manually coupled to and manually uncoupled from the exhaust manifold 23 without use of tools. The cooling water strainer 100 has a plug 102 with a plurality of holes 104 that separates solids from the cooling water as the cooling water flows through the manually serviceable cooling water strainer 100 towards the cooling water sprayer 30, see arrows A and B in FIG. 7. The plug 102 has an axially elongated body 106 with a first end 108 and an axially opposite, second end 110. The plurality of holes 104 is located at the first end 108 and faces the cooling water passage 13 when the plug 102 is coupled to the exhaust manifold 23, see FIG. 7. In the illustrated example, the first end 108 has a generally flat surface 112 and the plurality of holes 104 is formed through the generally flat surface 112.

Figure 7:
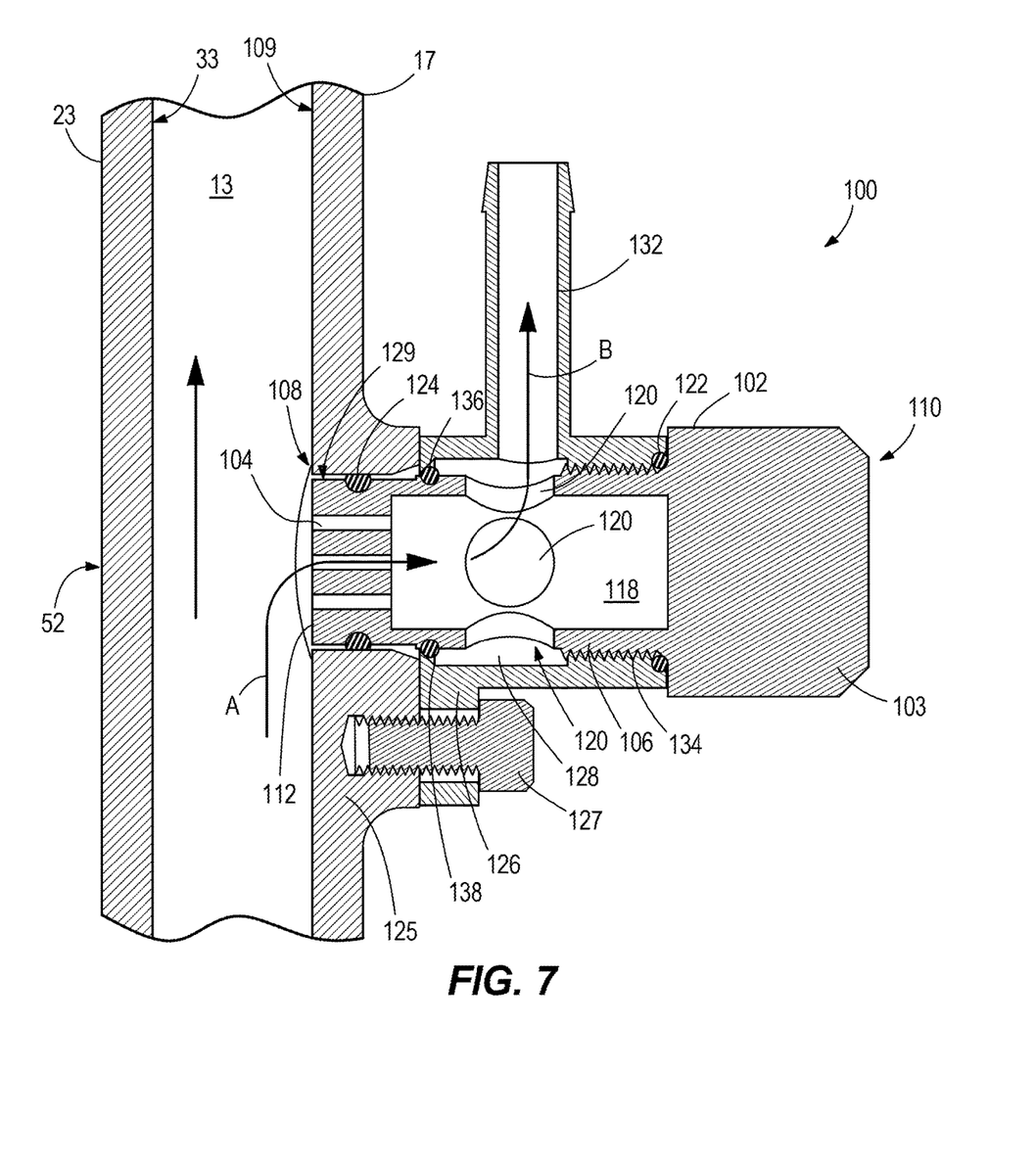
FIG. 7 is a sectional view of the cooling water strainer coupled to a water jacket on the exhaust manifold.
Figure 8:
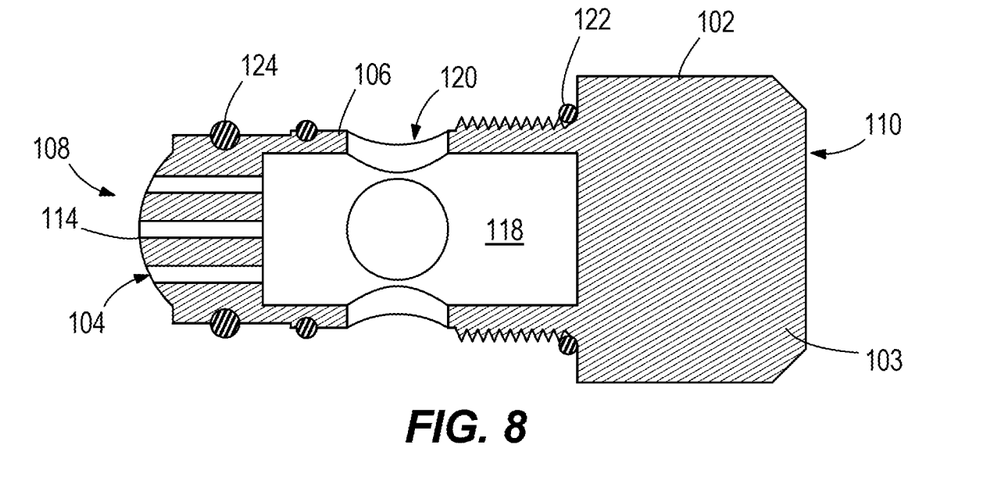
FIG. 8 is a sectional view of an alternate example of the cooling water strainer.
Figure 9:
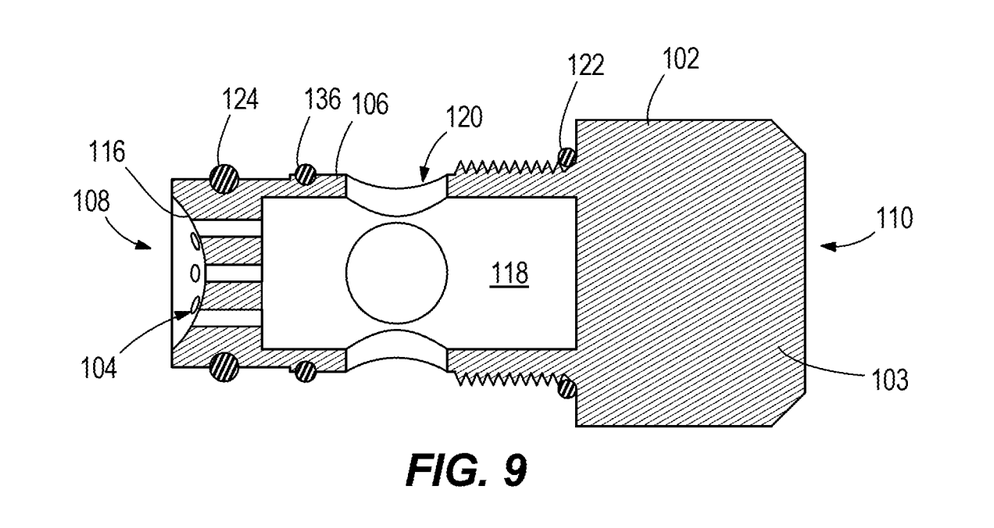
FIG. 9 is a sectional view of another alternate example of the cooling water strainer.

Referring to FIG. 7, the generally flat surface 112 lies flush with a radially inner surface 109 of the cooling water jacket 17 when the plug 102 is coupled to the exhaust manifold 23. In the alternate example shown in FIG. 8, the first end 108 has a convex surface 114 and the plurality of holes 104 is formed through the convex surface 114. Optionally, the convex surface 114 can protrude into the cooling water passage 13 when the plug 102 is installed onto the exhaust manifold 23. In the alternate examples shown in FIG. 9, the first end 108 has a sunken or concave surface 116 and the plurality of holes 104 is formed through the concave surface 116.

Referring to FIG. 7, the plug 102 further includes an internal bore 118 that receives cooling water from the cooling water passage 13 via the plurality of holes 104 and a radially oriented plug outlet 120 through which the cooling water flows from the internal bore 118 to the cooling water sprayer 30. One or more plug outlets 120 are located axially between the first end 108 and second end 110. First and second seals 122, 124 are located on opposite sides of the plug outlet 120. The first and second seals 122, 124 together form a water-tight seal with respect to the exhaust manifold 23 and internal bore 118 when the plug 102 is manually coupled to the exhaust manifold 23.

In the illustrated example, a boss 126 is either formed on or fixedly connected to a corresponding boss 125 and through-bore 129 in the cooling water jacket 17 on the exhaust manifold 23. In the illustrated example, the boss 126 is coupled to the exhaust manifold 23 by a fastener 127. The boss 126 has an internal bore 128 into which the plug 102 extends when the cooling water strainer 100 is coupled to the exhaust manifold 23. In this position, the first and second seals 122, 124 form the water-tight seal via a press-fit with the inner surface 130 of the internal bore 128 and/or with an internal surface on the through-bore 129 on the cooling water jacket 17.

The boss 126 has a radially extending boss outlet 132 through which cooling water from the plug outlet 120 is conveyed to the cooling water sprayer 30 via conduit 34 (see FIG. 2). The boss outlet 132 can be sized to control the amount of water that is passed to the sprayer 30 to optimize spray pattern. The second end 110 of the plug 102 has a handle tab 103 that is configured for pinching between the fingers of a service technician for removal and replacement of the plug 102 with respect to the exhaust manifold 23. In the illustrated example, the plug 102 is manually coupled to the boss 126 via a threaded connection 134, see FIG. 7, that is configured (sized and located) so that the plug outlet 120 automatically becomes radially aligned with the boss outlet 132 when the plug 102 is axially inserted into and manually rotated until it is completely engaged with the boss 126. A third seal 136 is located between the first and second seals 122, 124, proximate to the first end 108 of the plug 102. The third seal 136 sealingly abuts a shoulder 138 in the internal bore 128 of the boss 126 and thus forms a seal with the shoulder 138 when the plug 102 is rotated into complete threaded engagement with the boss 126.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses disclosed herein may be used alone or in combination with other apparatuses. Various equivalents, alternatives and modifications are possible within the scope of the appended claims.

What is claimed is:

1. A marine propulsion device comprising:
   an engine;
   an elongated exhaust manifold for conveying exhaust gas from the engine;
   an elongated cooling water jacket on the exhaust manifold, wherein an elongated cooling water passage for conveying cooling water alongside the exhaust manifold is entirely defined radially between the cooling water jacket and the exhaust manifold;
   a cooling water sprayer that sprays cooling water into the exhaust manifold; and
   a manually serviceable cooling water strainer configured to strain cooling water supplied from the cooling water passage to the cooling water sprayer;
   wherein the cooling water strainer comprises a plug having a plurality of holes that separates solids from the cooling water as the cooling water flows through the cooling water strainer prior to flowing through the cooling water sprayer; and
   wherein the plug comprises an elongated body having a first end and an opposite, second end, wherein the plurality of holes is located at the first end, and wherein the elongated body of the plug transversely extends through the cooling jacket such that the plurality of holes faces the cooling water passage and thus receives cooling water from the cooling water passage.

2. The marine propulsion device according to claim 1, wherein the cooling water strainer is located between the cooling water passage and the cooling water sprayer and is configured so as to be manually coupled to and manually uncoupled from the exhaust manifold without use of a tool.

3. The marine propulsion device according to claim 1, wherein the first end has a concave surface and wherein the plurality of holes is formed through the concave surface.

4. The marine propulsion device according to claim 1, wherein the first end has a convex surface and wherein the plurality of holes is formed through the convex surface.

5. The marine propulsion device according to claim 1, wherein the first end has a generally flat surface and wherein the plurality of holes is formed through the flat surface.

6. The marine propulsion device according to claim 5, wherein the generally flat surface lies flush with a radially inner surface of the cooling water jacket when the plug is coupled to the exhaust manifold.

7. The marine propulsion device according to claim 1, wherein the plug further comprises an internal bore that receives cooling water from the cooling water passage via the plurality of holes and a plug outlet through which the cooling water radially flows from the internal bore to the cooling water sprayer.

8. The marine propulsion device according to claim 7, wherein the plug outlet is located axially between the first and second ends.

9. The marine propulsion device according to claim 8, wherein the second end is configured for manual grasping by a service technician for removal and replacement of the plug with respect to the exhaust manifold.

10. The marine propulsion device according to claim 8, further comprising first and second seals located on opposite sides of the plug outlet, respectively, wherein the first and second seals forms a water-tight seal with respect to the exhaust manifold when the plug is manually coupled to the exhaust manifold.

11. The marine propulsion device according to claim 10, further comprising a boss on the exhaust manifold, wherein the boss comprises an internal bore into which the plug extends when the cooling water strainer is coupled to the exhaust manifold, and wherein the first and second seals form the water-tight seal via a press-fit with the internal bore.

12. The marine propulsion device according to claim 11, wherein the boss is coupled to the exhaust manifold by a fastener.

13. The marine propulsion device according to claim 11, wherein the boss comprises a radially extending boss outlet through which cooling water from the plug outlet is conveyed to the cooling water sprayer.

14. The marine propulsion device according to claim 13, wherein the plug is manually coupled to the boss via a threaded connection that is configured so that the plug outlet automatically becomes radially aligned with the boss outlet when the plug is engaged with the boss.

15. The marine propulsion device according to claim 11, further comprising a third seal located axially between the first and second seals, and a shoulder in the internal bore of the boss, wherein the third seal sealingly engages with the shoulder when the plug is coupled to the boss.

16. A manually serviceable cooling water strainer for straining cooling water flowing through a cooling water passage entirely defined radially between a cooling water jacket and an exhaust manifold for conveying exhaust gas from a marine propulsion device, wherein the manually serviceable cooling water strainer is configured so as to be manually coupled to and manually uncoupled from the cooling water jacket without use of a tool, the manually serviceable cooling water strainer comprising:
   a plug having an elongated body and plurality of holes that separates solids from the cooling water as the cooling water flows through the manually serviceable cooling water strainer, wherein the plug further comprises an internal bore that receives cooling water from the cooling water passage via the plurality of holes and a plug outlet through which the cooling water flows;
   wherein the plug outlet is located axially between a first and a second end and wherein the plurality of holes is located at the first end, and the second end is configured for manual grasping by a service technician for removal and replacement of the plug with respect to the exhaust manifold;
   a boss on the cooling water jacket of the exhaust manifold, wherein the boss comprises an internal bore into which the plug extends when the cooling water strainer is coupled to the exhaust manifold such that the elongated body of the plug extends transversely through the cooling water jacket such that the first end of the plug faces the cooling water passage and thus receives the cooling water flowing through the cooling water passage;
   first and second seals located on opposite sides of the outlet, respectively, wherein the first and second seals forms a water-tight seal with respect to the plug and the exhaust manifold when the plug is manually coupled to the boss, and
   wherein the boss comprises a radially extending boss outlet through which cooling water from the plug outlet is conveyed.

17. The manually serviceable cooling water strainer according to claim 16, wherein the plug is manually coupled to the boss via a threaded connection that is configured so that the plug outlet automatically becomes radially aligned with the plug outlet when the plug is engaged with the boss.

18. The manually serviceable cooling water strainer according to claim 17, further comprising a third seal located axially between the first and second seals, and a shoulder in the internal bore of the boss, wherein the third seal sealingly engages with the shoulder when the plug is coupled to the boss.

\* \* \* \* \*